United States Patent [19]
Huynh

[11] Patent Number: 5,942,829
[45] Date of Patent: *Aug. 24, 1999

[54] HYBRID ELECTRICAL MACHINE INCLUDING HOMOPOLAR ROTOR AND STATOR THEREFOR

[75] Inventor: Co Si Huynh, Glendale, Calif.

[73] Assignee: AlliedSignal Inc., Morristown, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/910,436

[22] Filed: Aug. 13, 1997

[51] Int. Cl.$^6$ .................................................. H02K 1/27
[52] U.S. Cl. ...................... 310/178; 310/181; 310/190; 310/156
[58] Field of Search ................................ 310/190, 191, 310/181, 178, 156, 216, 49 R, 114, 184, 254, 258

[56] References Cited

U.S. PATENT DOCUMENTS

| | | | |
|---|---|---|---|
| 3,411,027 | 11/1968 | Rosenberg | 310/181 |
| 3,553,510 | 1/1971 | Howey | 310/271 |
| 3,555,327 | 1/1971 | Terry | 310/168 |
| 4,385,251 | 5/1983 | Mallick et al. | 310/178 |
| 4,406,958 | 9/1983 | Palmero et al. | 310/49 R |
| 4,656,379 | 4/1987 | McCarty | 310/181 |
| 5,629,575 | 5/1997 | Cazal et al. | 310/91 |

FOREIGN PATENT DOCUMENTS

2225174 A  5/1990  United Kingdom ................... 310/178

*Primary Examiner*—Nestor Ramirez
*Assistant Examiner*—K. Eizo I. Tamai
*Attorney, Agent, or Firm*—Robert Desmond, Esq.

[57] ABSTRACT

An electrical machine includes both a permanent magnet source of field excitation and an electromagnetic source of field excitation. The electrical machine also includes a homopolar rotor, which carries the permanent magnet source, and a lamination stack having a middle portion and outer portions. The homopolar rotor and the middle portion of the lamination stack conduct flux generated by the permanent magnet source. The homopolar rotor and the outer portions of the lamination stack conduct flux generated by the electromagnetic source when the electromagnetic source is energized.

10 Claims, 3 Drawing Sheets

HYBRID ELECTRICAL MACHINE INCLUDING HOMOPOLAR ROTOR AND STATOR THEREFOR

BACKGROUND OF THE INVENTION

The present invention relates to an electrical machine that utilizes both permanent magnets and an electromagnetic coil for field excitation. When such a hybrid electrical machine is operated as a generator, its output voltage can be bucked or boosted by varying the direction and amplitude of current flowing though the electromagnetic coil.

The hybrid electrical generator combines the ruggedness, light weight and compactness of a permanent magnet generator with the variable voltage capability of an inductor generator. Unlike a permanent magnet generator, the hybrid electrical generator does not require complex circuitry for regulating output voltage, and it does not require a parasitic load for dumping excess energy. The hybrid electrical generator is also smaller than an inductor generator designed for the same operating parameters.

However, the hybrid electrical generator is big and bulky in comparison to a permanent magnet generator designed for the same operating parameters. Size being important, a compact hybrid electrical generator is needed.

SUMMARY OF THE INVENTION

A compact electrical machine according to the present invention comprises a rotor assembly including a permanent magnet source of excitation, and a stator assembly including an electromagnetic source of excitation. The stator assembly further includes a flux collector having a middle portion for the permanent magnet source and first and second outer portions for the electromagnetic source. The middle portion is magnetically insulated from the outer portions.

DETAILED DESCRIPTION OF THE INVENTION

Figure 1:
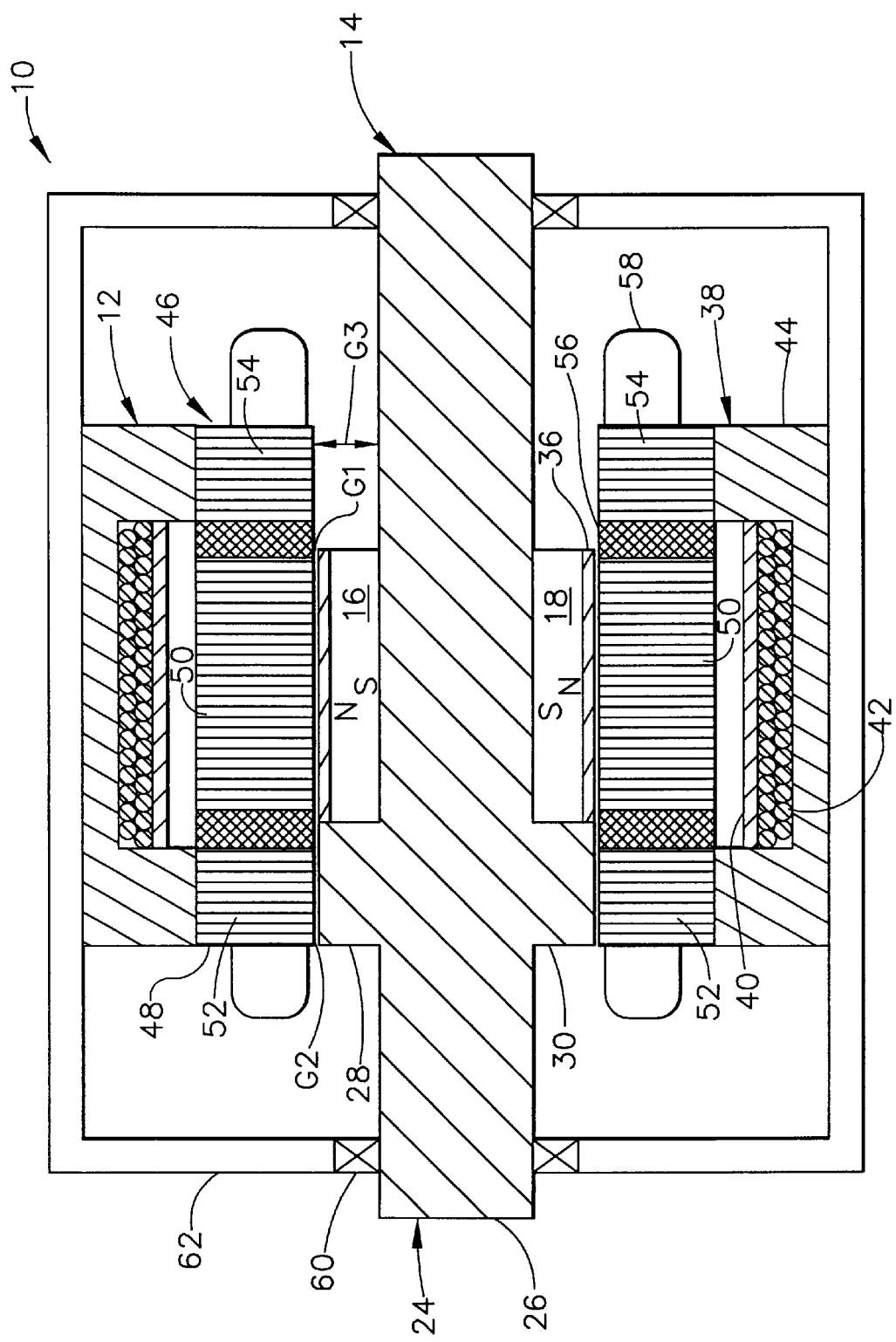
FIG. 1 is a cross-sectional view of an electrical machine according to the present invention.
Figure 2:
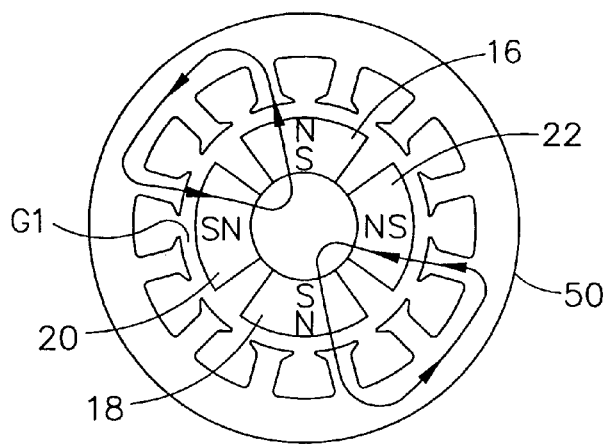
FIG. 2 is an illustration of flux flowing in the electrical machine, the flux being generated by permanent magnets, which form a part of the electrical machine.
Figure 3:
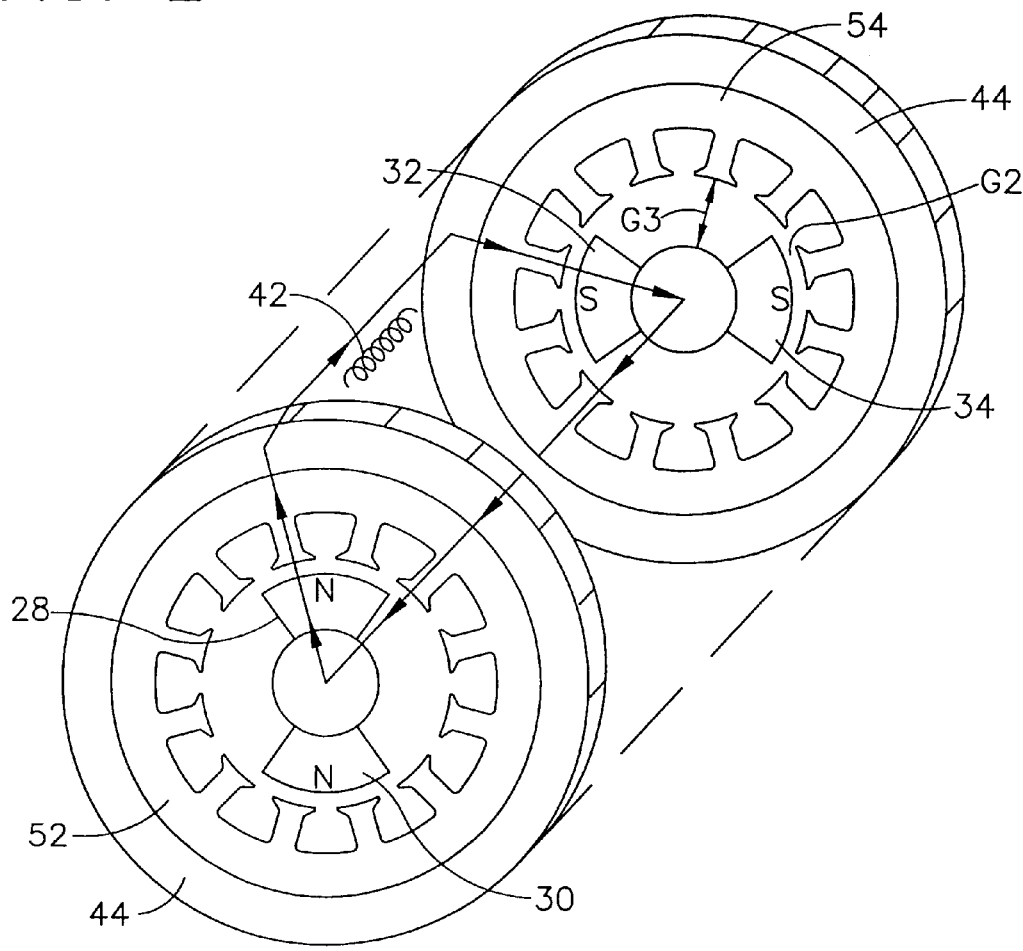
FIG. 3 is an illustration of flux flowing in the electrical machine, the flux being generated by an electromagnet, which forms a part of the electrical machine.
Figure 4:
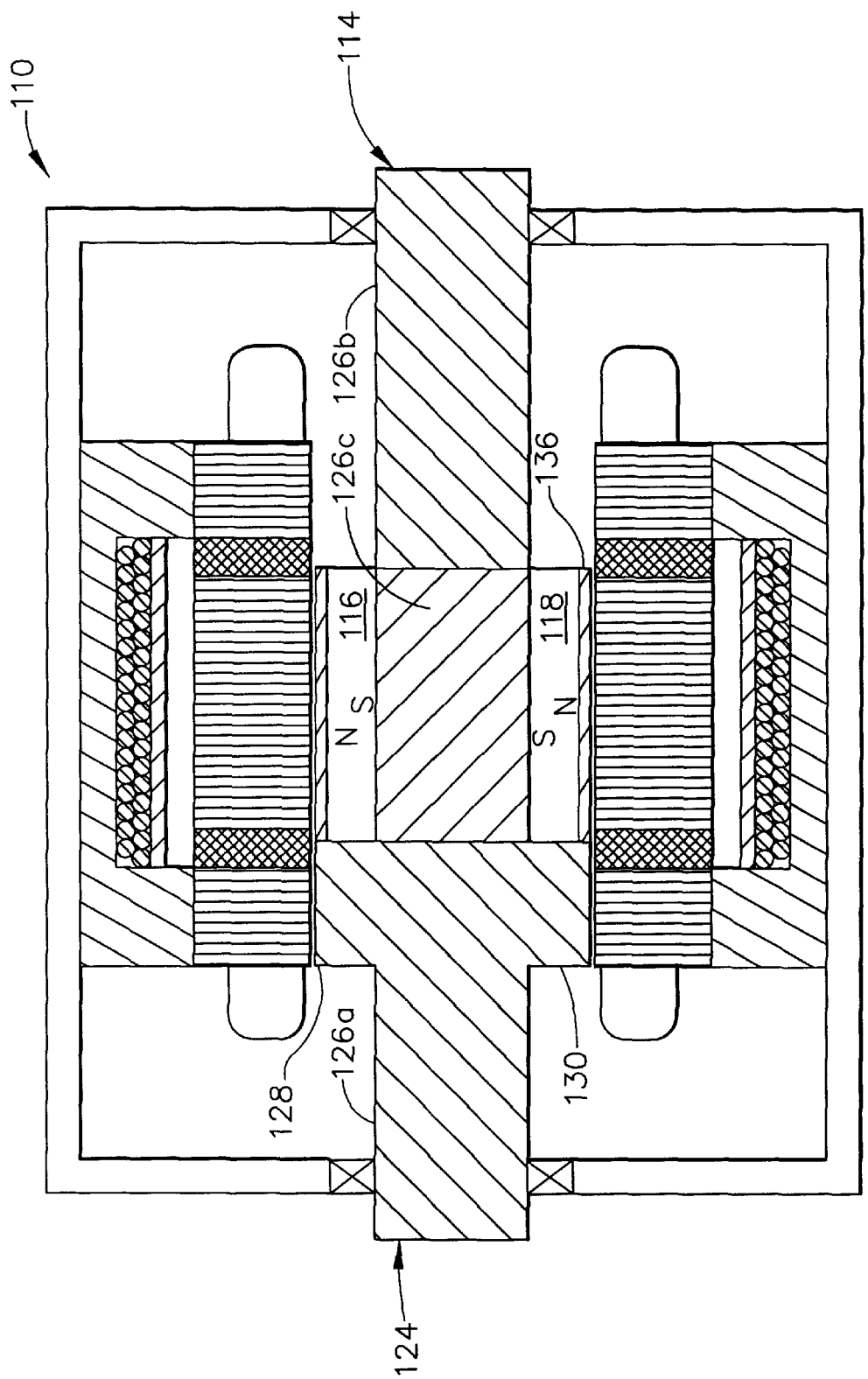
FIG. 4 is a cross-sectional view of an alternative embodiment of the electrical machine.

FIGS. 1, 2 and 3 show a hybrid electrical machine 10 including a stator assembly 12 and a rotor assembly 14. The rotor assembly 14 includes a first, second, third and fourth permanent magnets 16, 18, 20, 22, which provide a first source of field excitation for the electrical machine 10. FIGS. 1 and 2 show the magnets 16, 18, 20, 22 being magnetized radially and arranged in a standard four-pole configuration. The permanent magnets 16, 18, 20, 22 can be made of ceramic or any other magnetic material. High-speed machines might utilize permanent magnets 16, 18, 20, 22 made of a magnetic material having a high energy product, such as a rare earth material.

The rotor assembly 14 also includes a homopolar rotor 24 made of a high-strength ferromagnetic material. The homopolar rotor 24 includes a shaft 26, which carries the permanent magnets 16, 18, 20, 22; a first pair of ferromagnetic pole pieces 28, 30 extending radially from the shaft 26 adjacent one side of the permanent magnets 16, 18, 20, 22; and a second pair of ferromagnetic pole pieces 32, 34 extending radially from the shaft 26 adjacent an opposite side of the permanent magnets 16, 18, 20, 22. The ferromagnetic pole pieces 28, 30 of the first pair are circumferentially offset by 90 mechanical degrees and 180 electrical degrees from the ferromagnetic pole pieces 32, 34 of the second pair to form North and South poles. The ferromagnetic pole pieces 28, 30 of the first pair are circumferentially aligned with the first and second permanent magnets 16, 18 (i.e., the North pole magnets), and the ferromagnetic pole pieces 32, 34 of the second pair are circumferentially aligned with the third and fourth permanent magnets 20, 22 (i.e., the South pole magnets). The homopolar rotor 24 can be machined from a single piece of a ferromagnetic material, whereby the shaft 26 and the pole pieces 28, 30, 32, 34 are integrally formed.

In high speed machines, the permanent magnets 16, 18, 20, 22 are retained by a retainer sleeve 36 made of a non-magnetic material such as a composite graphite. The retainer sleeve 36 is wound over the permanent magnets 16, 18, 20, 22. Gaps between the permanent magnets 16, 18, 20, 22 can be filled with a non-magnetic material such as an epoxy.

The permanent magnets 16, 18, 20, 22 and the retainer sleeve 36 are disposed entirely between the ferromagnetic pole pieces 28, 30, 32, 34. Outer diameters of the retainer sleeve 36 and the ferromagnetic pole pieces 28, 30, 32, 34 are substantially the same. Resulting is a compact rotor assembly 14.

The stator assembly 12 includes an electromagnet 38 operable to provide a second source of excitation for the electrical machine 10. The electromagnet 38 includes a bobbin 40 made of a non-magnetic material, a coil 42 wound around the bobbin 40, and a ferromagnetic yoke 44 to which the bobbin 42 is secured.

The stator assembly 12 also includes a flux collector 46 disposed between the rotor assembly 14 and the electromagnet 38. The flux collector 46 includes a lamination stack 48 having a middle portion 50 and first and second outer portions, 52, 54. Magnetic insulators 56 having the same shape as the laminations in the stack 48 are disposed between the middle portion 50 and the outer portions 52, 54. The magnetic insulators 56, which can be made of a non-metallic or plastic material, magnetically insulate the middle portion 50 from the outer portions 52, 54.

Stator windings 58 are wound around the middle and outer portions 50, 52, 54 of the lamination stack 48. The windings 58 can have a conventional configuration, such as a three-phase phase configuration. Resulting is a compact stator assembly 12.

The middle portion 50 of the lamination stack 48 is aligned with the permanent magnets 16, 18, 20, 22. Between the outer surface of the permanent magnets 16, 18, 20, 22 and the inner surface of the middle portion 50 is a first radial air gap G1 of low reluctance. The middle portion 50 and the shaft 26 provide a conductive path for flux from the permanent magnets 16, 18, 20, 22. The first outer portion 52 of the lamination 48 stack is aligned with the first pair of pole pieces 28, and the second outer portion 54 of the lamination 48 stack is aligned with the second pair of pole pieces 32, 34. Between the outer surfaces of the ferromagnetic pole pieces 28, 30, 32, 34 and the inner surface of the lamination stack 48 is a second air gap G2 of low reluctance. Between the outer surface of the shaft 26 and the inner surface of the laminations stack 48 is a third air gap G3 of high reluctance. The yoke 46, the outer portions 52, 54 of the lamination stack 48 and the homopolar rotor 24 provide a conductive circuit for the flux generated by the coil 42.

The rotor assembly 14 is supported by bearings 60 within a housing 62. The yoke 44 is secured to the housing 62, and the outer portions 52, 54 of the lamination stack 48 are secured to the yoke 44.

The electrical machine 10 is operated as an electrical generator by rotating the shaft 26, varying the amplitude and direction of current in the coil 42, and extracting electrical energy from the stator windings 58. While the shaft 26 is being rotated, flux from the first and second permanent magnets 16, 18 flows across the first air gap G1 to the middle portion 50 of the lamination stack 48, partially around the lamination stack 48, back across the first air gap G1, to the third and fourth permanent magnets 20, 22, through the shaft 26, and back to the first and second permanent magnets 16, 20 (see FIG. 2). As the shaft 26 is rotated and flux from the permanent magnets 16, 18, 20, 22 cuts through the stator windings 58, an ac voltage is induced in the stator windings 58.

When the coil 42 is energized, flux from the coil 42 flows from the yoke 46 to the first outer portion 52 of the lamination stack 48, across the second air gap G2, down the ferromagnetic poles 28, 30 of the first pair, to the shaft 26, across the shaft 26 to the pole pieces 32, 34 of the second pair, back across the second air gap G2, through the second outer portion 54 of the lamination stack 48, and back to the yoke 46 (see FIG. 3). The magnetic insulators 56 prevent the coil flux from short-circuiting across the middle portion 50 of the lamination stack 48. As the flux from the coil 42 cuts through the stator windings 58, an additional ac voltage is induced in the stator windings 58.

The coil 42 can boost or buck the output voltage of the electrical machine 10. The amplitude and direction of the current energizing the coil 42 determines the amount of boost or buck. If current flowing in one direction causes the coil 42 to boost the output voltage of the electrical machine 10, then current flowing in an opposite direction will cause the coil 42 to buck the output voltage.

The electrical machine 10 could have an electromagnet 38 that is capable of generating the same voltage as the permanent magnets 16, 18, 20, 22. Operating such a machine without the electromagnet 38 produces an output voltage at 50% of the machine's maximum voltage. Varying the amplitude and direction of the current in the coil 42 can buck the output voltage of the electrical machine 10 to zero volts, boost the output voltage to the maximum voltage, or control the output voltage to a level between zero volts and the maximum voltage.

Thus disclosed is a hybrid electrical machine 10 that, when operated as an electrical generator, offers control over the output voltage without the need for complex, expensive, high power electronic circuitry. It does not require a parasitic load for dumping excess energy. Additionally, the electrical machine 10 has a small air gap G2 between the ferromagnetic pole pieces 28, 30, 32, 34 and the lamination stack 48, which results in a high flux density. Additionally, the hybrid electrical machine 10 is compact.

It is understood that changes and modifications can be made without departing from the spirit and scope of the present invention. For example, a rotor assembly 114 of a hybrid electrical machine 110 can include a homopolar rotor 124 having a multi-piece construction shown in FIG. 5. The homopolar rotor 124 has a first shaft section 126a and a first pair of ferromagnetic pole pieces 128, 130 extending radially from the first section 126a; a second shaft section 126b and a second pair of ferromagnetic pole pieces 132, 134 extending radially from the second section 126b; and a third shaft section 126c for carrying permanent magnets 116, 118, 120, 122. The third and fourth permanent magnets 120, 122 and the pole pieces 132, 134 of the second pair. The multi-piece construction allows for easier fabrication and assembly of the rotor assembly 114. A permanent magnet rotor (i.e., the permanent magnets 116, 118, 120, 122, a retainer sleeve 136, and the third shaft section 126c) can be pre-assembled, and the pre-assembled rotor can then be clamped between the first and section shaft sections 126a, 126b by means such as a tie rod (not shown). Additionally, the retainer sleeve 136 can be shrink-fitted (instead of wound) over the permanent magnets 116, 118, 120, 122.

A specific electrical machine 10 is designed in accordance with its intended usage. Thus, the electrical machine 10 is not limited to the four-pole configuration and the lamination geometry shown in the drawings.

Dimensions of the electrical machine 10 are also determined in accordance with the intended usage. Overall axial length and diameter of the electrical machine 10 is determined by factors such as its desired power rating. The homopolar rotor 24 is sized to handle flux from the electromagnet 38 and the permanent magnets 16, 18, 20, 22 without saturating. The relative sizes and strengths of the electromagnet 38 and permanent magnets 16, 18, 20, 22, and the relative lengths of the middle 50 and outer portions 52, 54 of the lamination stack 48 depend upon the desired amount of control over the output voltage. An electrical machine 10 having less control (e.g., ±10%) of the output voltage will have a relatively smaller electromagnet 38 and pole pieces than an electrical machine having the same power rating but having total control over the output voltage.

Finally, the electrical machine 10 can be operated as a motor. Conventional motor circuitry such as inverters and sensors can supply an excitation to the stator windings 58. The amplitude of the field excitation can be controlled either by the electromagnet 38 or the conventional motor circuitry.

I claim:

1. An electrical machine comprising:

a rotor assembly including a permanent magnet source of excitation, a shaft, a first ferromagnetic pole piece extending radially outward from the shaft, and a second ferromagnetic pole piece extending radially outward from the shaft, the first and second pole pieces being axially spaced apart, the permanent magnet source being secured to the shaft between the first and second pole pieces; and a stator assembly including an electromagnetic source of excitation and a flux collector surrounding the rotor assembly, the flux collector having a middle portion and first and second outer portions, the middle portion being separated from the first and second outer portions by first and second gaps;

wherein each portion of the flux collector includes a lamination stack, and wherein the gaps are filled by non-metallic material;

the first outer portion being axially aligned with the first pole piece, the second outer portion being axially aligned with the second pole piece, and the middle portion being axially aligned with the permanent magnet source;

the electromagnetic source being coupled to the first and second outer portions.

2. The electrical machine of claim 1, wherein the middle portion of the flux collector and the shaft conduct flux generated by the permanent magnet source, and wherein the shaft, the pole pieces and the outer portions of the flux collector conduct flux generated by the electromagnetic source when the electromagnetic source is energized.

3. The electrical machine of claim 2, wherein the first pole piece is part of a first group of ferromagnetic pole pieces extending radially from the shaft in axial alignment with the first outer portion of the flux collector; and wherein the second pole piece is part of a second group of ferromagnetic pole pieces extending radially from the shaft in axial alignment with the second outer portion of the flux collector.

4. The electrical machine of claim 3, wherein the shaft of the homopolar rotor is integral with the first and second groups of pole pieces.

5. The electrical machine of claim 4, wherein the rotor assembly further includes a retainer sleeve wound around the permanent magnet source, the retainer sleeve and the ferromagnetic pole pieces having substantially the same outer diameters.

6. The electrical machine of claim 3, wherein the shaft of the homopolar rotor includes first, second and third sections, the first group of ferromagnetic pole pieces extending radially from the first section of the shaft, the second group of ferromagnetic pole pieces extending radially from the second section of the shaft, the third section of the shaft carrying the permanent magnet source.

7. The electrical machine of claim 6, wherein the rotor assembly further comprises a retainer sleeve for the permanent magnet source, the retainer sleeve and the ferromagnetic pole pieces having substantially the same outer diameters.

8. The electrical machine of claim 1, wherein the electromagnetic source includes:

a bobbin surrounding the flux collector;

a coil wound around the bobbin; and a ferromagnetic yoke for conducting flux from the coil to the outer portions of the flux collector when the coil is energized.

9. The electrical machine of claim 1, wherein the stator assembly further includes stator windings wound around the middle and outer portions of the flux collector.

10. The electrical machine of claim 1, wherein the electromagnetic source includes a coil, and a ferromagnetic yoke; wherein the middle portion of the flux collector and the shaft provide a conductive path for flux generated by the permanent magnet source; and wherein the yoke, the outer portions of the flux collector, the shaft and the pole pieces form a conductive circuit for flux generated by the coil when the coil is energized.

* * * * *